United States Patent [19]

Faivre et al.

[11] 4,009,368
[45] Feb. 22, 1977

[54] YOGHURT-MAKING MACHINE

[75] Inventors: Andre Faivre, Dijon; Pierre Tanguy, Daix, both of France

[73] Assignee: Etud S.A., Dijon, France

[22] Filed: Sept. 6, 1974

[21] Appl. No.: 503,919

[30] Foreign Application Priority Data

Sept. 25, 1973 France .............. 73.34316

[52] U.S. Cl. .............................. 219/430; 99/453; 126/273.5; 165/104 S; 219/387; 219/441; 219/530; 426/34

[51] Int. Cl.² .............. H05B 1/02; A23C 3/02; F24C 15/34

[58] Field of Search .......... 136/161; 219/210, 378, 219/385, 386, 387, 430, 441, 521, 530, 429, 436–439, 442, 540; 165/104, 105; 126/400, 273.5, 375, 246; 99/452, 453; 426/34

[56] References Cited

UNITED STATES PATENTS

| 2,006,059 | 6/1935 | Rudorff | 219/439 |
|---|---|---|---|
| 2,187,196 | 1/1940 | Douglass | 219/387 |
| 3,020,383 | 2/1962 | Onishi et al. | 219/530 X |
| 3,038,058 | 6/1962 | Gordon | 126/400 X |
| 3,110,633 | 11/1963 | Bachmann | 136/161 |
| 3,264,448 | 8/1966 | Lehmer | 219/439 X |
| 3,400,249 | 9/1968 | Mekjean et al. | 219/530 X |
| 3,548,930 | 12/1970 | Byrd | 219/530 X |
| 3,569,669 | 3/1971 | March | 219/378 |
| 3,764,780 | 10/1973 | Ellis | 219/430 |
| 3,805,018 | 4/1974 | Luong et al. | 219/387 |
| 3,994,039 | 12/1966 | Ogden | 219/439 X |

FOREIGN PATENTS OR APPLICATIONS

| 642,697 | 3/1937 | Germany | 219/386 |
|---|---|---|---|
| 157,636 | 11/1950 | Netherlands | 219/386 |

Primary Examiner—A Bartis
Attorney, Agent, or Firm—Young & Thompson

[57] ABSTRACT

A yoghurt-making machine comprises an enclosure inside which a receptacle containing milk pots is disposed above a basin. The space between the receptacle and basis is partly filled with a fusible material, such as commercial paraffin wax which has a cooling curve exhibiting a solidification plateau at a temperature near to the optimum temperature of yoghurt formation. A heating resistor attached to the basin is immersed in the fusible material which is thereby heated. The basin has a bottom defining with the enclosure a closed chamber completely separated from the fusible material. A temperature-limiting element is connected to the resistor and disposed so as to be responsive only to the air temperature within the chamber and is operable to terminate the heating of the fusible material when the temperature in the chamber is higher than the solidification plateau of the fusible material. The amount of the fusible material is sufficient for its solidification plateau to be maintained during subsequent cooling throughout the duration required for the formation of the yoghurt.

3 Claims, 10 Drawing Figures

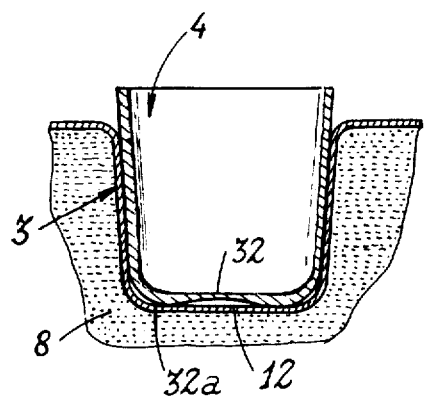
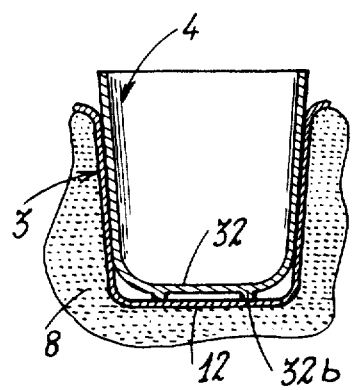
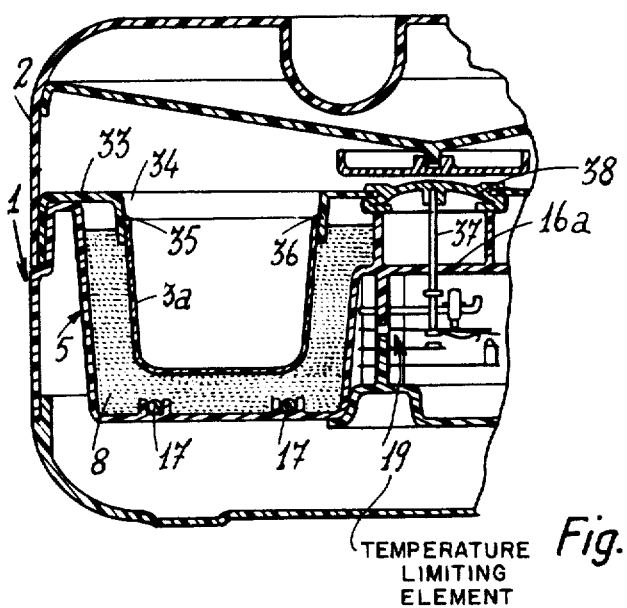
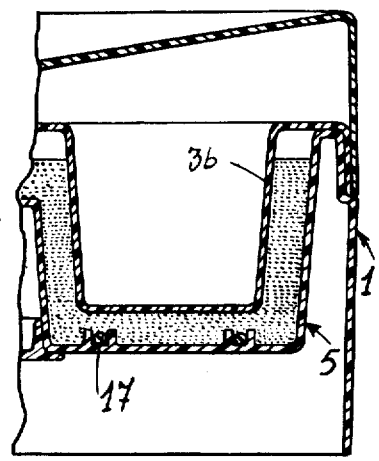

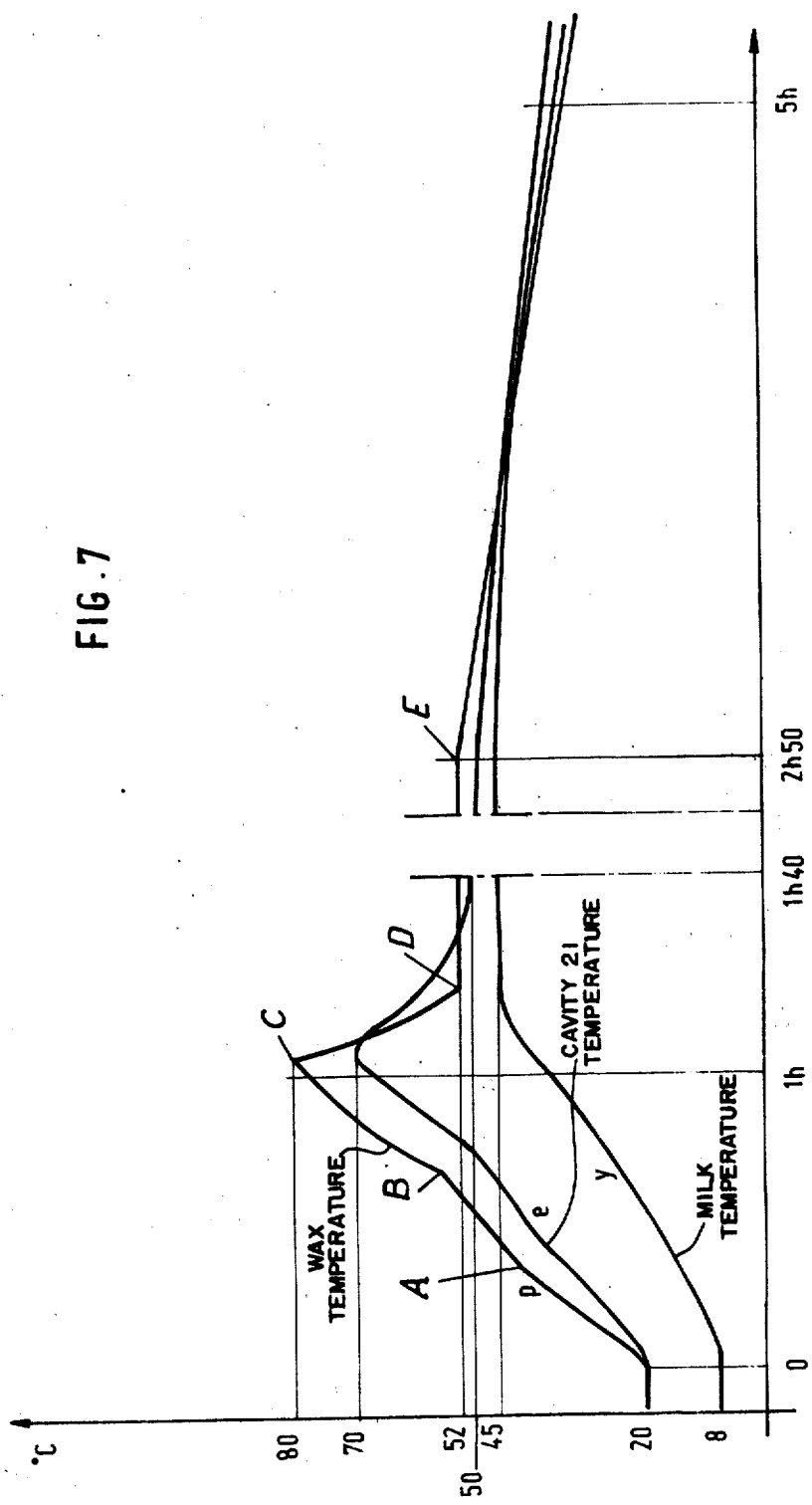

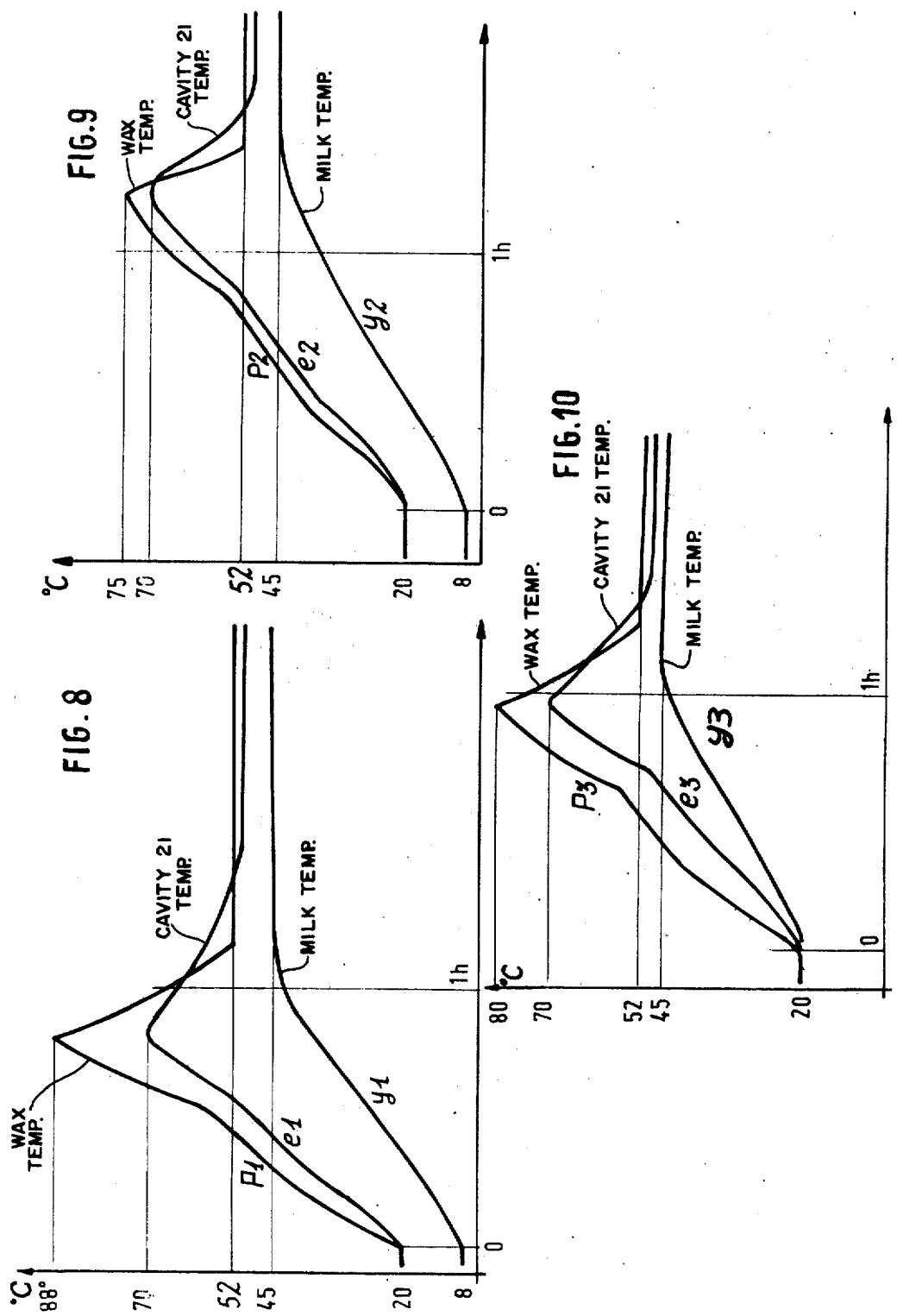

YOGHURT-MAKING MACHINE

BACKGROUND OF THE INVENTION

This invention relates to a yoghurt-making machine, inter alia for domestic use, enabling yoghurt to be prepared from different commercially available milks.

At present two kinds of yoghurt-making machines are commercially available. One of them comprises an isothermal enclosure in which earthenware pots are disposed. The milk, preheated to about 50° C and seeded with lactic ferments is poured into the pots, and then the isothermic enclosure is closed. The milk ferments and the yoghurt is formed during cooling. This kind of yoghurt-making machine is very simple is design, but it has the disadvantage of requiring separate heating of the milk and checking of its temperature before performing seeding with lactic ferments.

The other kind of known yoghurt-making machine comprises electrical heating means. The cold-seeded milk is poured directly into a receptacle or into pots disposed in the enclosure. Then the milk is heated until thermal equilibrium is reached between the heat supplied by the electrical heating means, the heat absorbed by the yoghurt-making machine, and the heat dissipated to the atmosphere.

The disadvantages of the last-mentioned machines are that they operate slowly due to the low speed at which the temperature of the milk rises, and the temperature cannot be accurately controlled, as a result of fluctuations in the mains voltage and the ambient temperature. However, it is important to keep the milk at a predetermined constant temperature, so as to give the yoghurt a suitable degree of acidity and a sufficiently-developed aroma. Experience has shown that the optimum yoghurt-forming temperature is close to 45° C, such temperature being favourable to the development of *Streptococcus thermophilus*, which acts on acidity, and *Lactobacillus bulgaricus*, which develops the aroma. It is also found that the aforementioned temperature should be maintained for at least two hours.

SUMMARY OF THE INVENTION

It is an object of the invention to obviate the disadvantages of the prior art machines and to provide an electrically heated yoghurt-making machine which enables the optimum yoghurt-forming temperature to be quickly reached, such temperature also being stabilised using very simple means.

Accordingly, the present invention provides a yoghurt-making machine, inter alia for domestic use, comprising an enclosure inside which a milk receptacle is disposed, and electrical milk-heating means, in which machine the electrical heating means are separated from the milk receptacle by a fusible material which is arranged for heating by the heated means and has a cooling curve exhibiting a solidification plateau at a temperature near to the optimum temperature of yoghurt formation.

Thus by using relatively powerful heating means the temperature of the milk can be caused to rise rapidly until the fusible material melts. After heating has stopped, the temperature of the milk is kept substantially constant for the duration of the solidification plateau of the fusible body. Such duration depends on the latent heat produced on solidification of the fusible material and the amount of such material in contact with the or each milk receptacle.

In one advantageous embodiment of the invention, the amount of fusible material is sufficient for its solidification plateau to be maintained for the period required for yoghurt formation, which must be at least 2 hours.

In a preferred embodiment of the invention, a temperature-limiting element is disposed in a chamber separated from the fusible material, such temperature-limiting element being adapted to cut off the heating of the fusible material when the temperature in such chamber is higher than that of the solidification plateau of the fusible material.

In this way the required temperature for the milk can be obtained by a predetermined adjustment of the temperature-limiting element, whatever may be the variation in power dissipated by the heating means, resulting from fluctuations in the mains voltage.

The fusible material is preferably commercial paraffin wax having a solidification plateau at a temperature close to 52° C.

This temperature is slightly higher than the optimum development temperature of the lactic ferments, which is 45° C. However, this difference in temperature is advantageous, having regard to the thermal inertia of the assembly formed by the fusible material, the receptacle and the milk.

Paraffin wax was selected from amongst the many materials fusible at a temperature close to 50° C, because of its low price, absence of smell, low vapour pressure at 50° C, absence of toxicity and inertness towards plastics and metals.

In this respect stearine and palmitine might also be suitable, but these products are not commercially available in high degree of purity, so that they have a less clearly defined solidification plateau than paraffin wax.

BRIEF DESCRIPTION OF THE DRAWINGS

In order that the invention may be readily understood, embodiments thereof will now be described, by way of example, with reference to the accompanying drawings, in which:

FIGS. 3 and 4 are sectional views showing various embodiments of milk pots;

FIG. 5 is a partial elevational and sectional view of another embodiment of the yoghurt-making machine according to the invention;

FIG. 6 is a partial elevational and sectional view of a further embodiment of the yoghurt-making machine.

FIGS. 7 to 10 are graphs showing the variation in temperature, at various places in the yoghurt-making machine, in dependence on time, for different operating conditions, FIG. 7 showing the temperature, at various places in the machine, in dependence on time for nominal heater power, FIG. 8 showing the same for greater than nominal heater power, FIG. 9 for less than nominal heater power and FIG. 10 when the milk is introduced into the pots at a higher temperature.

DESCRIPTION OF PREFERRED EMBODIMENTS

Figure 1:
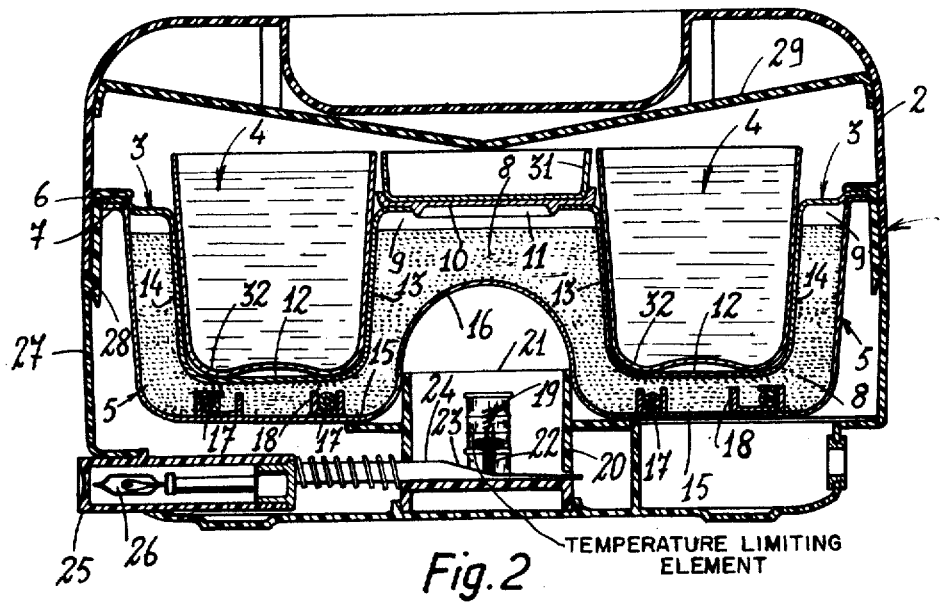
FIG. 1 is an elevational and sectional view of a yoghurt-making machine embodying the invention.

In the embodiment illustrated in FIG. 1, a yoghurt-making machine comprises an enclosure 1 closed by a cover 2 and containing a receptacle 3 in which milk pots 4 are disposed. The receptacle 3 is disposed in a basin 5 and the respective edges 6, 7 or the receptacle 3 and basin 5 are assembled, for instance, by crimping.

The space lying between the receptacle 3 and the basin 5 is almost completely filled by a fusible material 8 having a cooling curve exhibiting a solidification plateau at a temperature substantially equal to the optimum yoghurt-forming temperature and formed in this embodiment by commercially available paraffin wax melting at 52° C.

The amount of fusible material is sufficient for its solidification plateau to be maintained during the time required for yoghurt formation — at least 2 hours. In the embodiment illustrated in FIG. 1, the amount of paraffin wax used is preferably between 500 and 700 g, with a view to maintaining 1000 cm$^3$ of milk and 125 cm$^3$ of lactic ferments at about 38° C for 3½ to 5 hours. The free space 9 not filled by the fusible material 8 is provided to enable the fusible material 8 to expand freely. A plug 10 closes an aperture 11 through which the fusible material 8 is introduced. The closure of the aperture 11 by the plug 10, and also the assembly of the edges 6, 7 of the receptacle 3 and basin 5 are not airtight, so that the pressure above the fusible material 8 remains equal to atmospheric pressure when the material 8 is heated.

The bottom 12 of the receptacle 3 has an upstanding central projection 13 of a height substantially equal to that of the side wall 14 of the receptacle 3, the bottom 15 of the basin 5 having a dome-shaped protuberance 16 partly engaging in the central projection 13 of the receptacle 3. Due to the protuberance 16, the bottom 12 of the receptacle 3 is enclosed by a substantially constant thickness of fusible material 8, this being an advantageous feature providing uniform thermal exchange.

Electrical means for heating milk in the pots 4 comprise a resistor 17 attached to the bottom 15 of the basin 5 via insulating elements 18 of U-shaped cross-section, the resistor 17 being immersed in the fusible material 8.

Disposed in the protuberance 16 of the basin 5 are means for controlling the heating of the milk, formed by a temperature-limiting element 19 which cuts off the electrical supply to the resistor 17 when the temperature in cavity 21 is higher than that of the solidification plateau of the fusible material 8. In practice the cut-off temperature of the temperature-limiting element 19 is set between 60° and 75° C, in dependence on heat exchange conditions, corresponding to a temperature about 10°–25° C higher than the melting temperature of the paraffin wax. This is to ensure that the temperature of the seeded milk reaches between 42° and 55° C, the latter temperature being the maximum permissible for making yoghurt acceptable for consumption. The temperature-limiting element 19 is attached to a plastics cup 20 and cooperates with the wall of the protuberance 16 to bound the cavity 21. The provision of the cavity 21 partly within the fusible material 8 encourages heat exchange between the latter and the temperature-limiting element 19. The temperature-limiting element 19 is actuated by pressing on a button 22. In the embodiment illustrated, the button 22 is actuated via a ramp 23 formed on a rod 24 whose longitudinal displacement is controlled by a push button 25 of translucent material. The button 25 contains an indicator lamp 26 to show when heating is taking place.

In the embodiment illustrated, the receptacle 3 and basin 5 are attached to the bottom portion 27 of the enclosure 1 by a collar 28 having a peripheral groove engaging with a rib provided adjacent the free edge of the bottom portion 27. Attached inside the cover 2 is an inverted conical member 29 the apex of which is disposed above a bowl 31 which collects the condensation water resulting from the evaporation of the milk.

Figure 2:
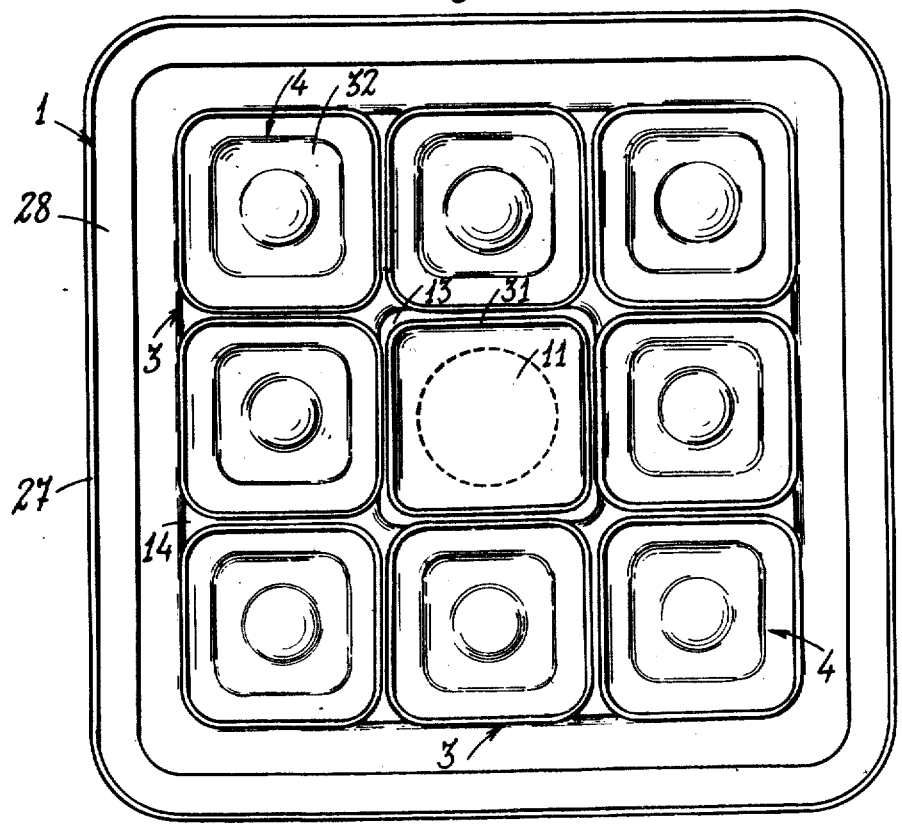
FIG. 2 is a plan view of the yoghurt-making machine illustrated in FIG. 1, the cover being removed.

As can be seen in FIG. 1, the milk pots 4, the receptacle 3 and the central projection 13 formed in the bottom 12 of the receptacle 3 are bounded by substantially flat walls taking the form of square-based frustums, as shown in FIG. 2. Eight milk pots 4 are disposed side-by-side in the space lying between the central projection 13 and the side wall of the receptacle 3, each pot 4 having two side walls in contact with the side wall of the receptacle 3. This arrangement ensures equality of heat exchange surfaces between the pots 4 and the fusible material 8 disposed in contact with the receptacle 3, this being an essential condition for obtaining a regular distribution of the temperature of the milk between the various pots 4. However, it has been found that despite all the care devoted to the construction, it is impossible to obtain intimate contact between the side walls of the receptacle 3, the pots 4 and the projection 13, since there must be a slight clearance between these various walls, more particularly to avoid jamming. As a result, if contact between the bottom 32 of the pots 4 and the bottom 12 of the receptacle 3 were intimate, the heat exchange at that level would be considerably more than via the side walls of the pots 4 and would result in the milk being overheated adjacent the bottom 32, giving a granular appearance to the yoghurt. Means have therefore been provided for reducing the heat exchange between the bottom 32 of the pots 4 and the fusible material 8.

To this end the bottoms 32 of the pots 4 are formed so as to reduce the contact surface of the bottom 32 with the bottom of the receptacle 3, as illustrated in FIG. 1.

The bottom 32 of the pots 4 can also comprise a thickened portion 32a in the contact zone with the bottom of the receptacle 3 (FIG. 3), or a peripheral supporting rib 32b (FIG. 4).

In the embodiments illustrated in FIGS. 1 and 2, the pots 4, the receptacle 3 and the basin 5 are preferably made of a material which is a good heat conductor, such as aluminium, to facilitate heat exchange between the fusible material 8 and the milk and between the material 8 and the cavity 21 containing the temperature-limiting element 19, the other parts of the yoghurt-making machine being advantageously made of thermoplastics.

In the embodiment illustrated in FIG. 5 the receptacle 3 is replaced by a receptacle formed with cells 3a to receive the individual pots 4 (not shown). The receptacle is fixed to a collar 33 attached to the basin 5. To this end, collar 33 is formed with apertures 34 having on their peripheries a groove 35 into which the curved edge 36 of the cells 3a fits.

In this embodiment the resetting control for the temperature-limiting element 19 is a rod 37 sliding in the front wall of the protuberance 16a and connected to a rubber diaphragm 38 attached to the centre of the collar 33.

All the parts forming this embodiment can be made of thermoplastics, except for the pots 4, which are advantageously made of aluminium.

In the embodiment illustrated in FIG. 6, all the parts of the yoghurt-making machine are made of thermoplastics, the receptacle 3b comprising, as in the preceding embodiment individual cells for receiving the pots 4. This embodiment has the advantage over the preceding ones that it is much more economical, but it is also less advantageous from the point of view of heat exchange.

The yoghurt-making machine illustrated in FIG. 1 operates as follows. The cold seeded milk (8° C) is poured into the pots 4 and the latter are placed in the receptacle 3. The temperature-limiting element 19 is actuated by pressing on the button 25, thus energising the heating resistor 17. The fusible material 8 quickly becomes heated and passes from the solid state (20° C) to the liquid state at point A of the curve $p$ shown in FIG. 7, which gives the variation in temperature of the material 8 as a function of time. Even though the fusible material 8 melts, the temperature continues to rise, but less quickly than before. The absence of a melting plateau parallel with the time axis is due to the fact that there are no convection currents inside the fusible material 8 which would be capable of rendering the temperature therein uniform.

The temperature then continues to rise from the point B to the point C, at which the body 8 reaches 80° C and the preadjusted temperature-limiting element 19 cuts off the current supply to the resistor 17. A drop in temperature is then observed due to the absorption of heat, inter alia by the sides of the basin, the receptacle 3, the box 4 and the milk. At the point D, the solidification plateau of the body 8 is reached. The plateau lies at 52° C in the case of the paraffin wax used in this example. This temperature remains constant for a duration depending more particularly on the amount of material 8 used and its latent heat of fusion. In the example described, the amount of paraffin wax present is 600 g and the solidification plateau lasts for about 3 hours. From the point E onwards the temperature of the material 8 slowly diminishes until it reaches ambient temperature (20° C).

FIG. 7 also shows the variation as a function of time of the temperature inside the cavity 21 which houses the temperature-limiting element 19 (curve $e$) and of the temperature of the milk (curve $y$). The difference between the various curves $p$, $e$ and $y$ is due to the thermal inertia of the assembly. It is found that the temperature of the milk (curve $y$) is stabilised at 45° C, which is the optimum yoghurt-formation temperature, such temperature being maintained throughout the duration of the solidification plateau of the fusible material.

It has also been found that it is advantageous to control the temperature $e$ in the cavity 21 containing the temperature-limiting element 19, rather than to control directly the temperature $y$ of the milk, having regard inter alia to fluctuations in the heating power. The fact is that the permitted tolerances on the values of the resistors and the mains network are equal to ±5% and ±10% of the nominal value respectively, giving a power range extending from 0.8571 to 1.1579 times the nominal value. Thus, if the temperature $y$ of the milk were to be controlled directly, different adjustments of the temperature-limiting element 19 would have to be made to reach a predetermined temperature of the milk, and this is hard to accept. On the other hand, if the temperature $e$ in the cavity 21 is controlled, a predetermined adjustment of the temperature-limiting element 19 can produce the required temperature of the milk, whatever the power, lying within the aforementioned limits, dissipated by the resistor 17 may be.

In fact, the greater the power dissipated, the more rapidly the temperature $p$ of the fusible material 8 rises, but the greater the difference between such temperature $p$ and the temperatures $e$ and $y$ when the power is cut off. For instance, for the nominal power (FIG. 7) the fusible material 8 (paraffin wax) reaches a temperature of 80° C after 1 hour, when the temperature of the milk $y$ is 40° C and that of the cavity $e$ is 70° C, the temperature at which the temperature-limiting element 19 cuts off the electric supply.

With a power equal to 1.16 times the nominal power (FIG. 8) the fusible material 8 reaches 90° C, when the temperature $e_1$ is 70° C. The temperature of the milk $y_1$ is then only 35° C, but will continue to rise to 45° C as the milk receives the heat stored in the fusible material 8, between its melting point and 90° C.

On the other hand, if the power is lower than the nominal power, for instance 0.85 times the nominal power (FIG. 9), the difference between the temperature $p_2$ reached by the fusible material 8 and the temperatures $e_2$ and $y_2$ are lower than before.

For instance, when $e_2$ reaches 70° C, $p_2$ is only 75° C, but on the other hand the temperature $y_2$ is 42°–44° C. The heat stored by the fusible material 8 between the melting point and 75° C is enough to make the temperature of the milk rise to 45° C.

Moreover, if the milk is introduced into the pots 4 at a temperature of 20° C, instead of 8° C, as in the case of the aforementioned examples, the fusible material 8 has less heat to supply to the milk and therefore becomes heated more rapidly (see FIG. 10). The difference between the curve $e_3$ and the curve $p_3$ is less than in the aforementioned FIG. 8, the temperature-limiting element 19 cuts off the supply earlier than before, the operational temperatures being then substantially identical.

The foregoing examples therefore show that the yoghurt-making machine according to the invention enables yoghurt to be prepared in optimum temperature conditions.

The optimum yoghurt-forming temperature is very quickly reached and is maintained substantially constant, due to the use of the latent heat of fusion of a fusible material disposed between the electrical heating means and the/or each milk receptacle.

Moreover, the use of the fusible material means that there is no need to use complicated means to control the power dissipated by the electrical heating resistor.

In the machine embodying the invention such control is performed merely by a temperature-limiting element received in a cavity separated from the fusible material. The temperature-limiting element automatically cuts off the heating when the temperature in the cavity 21 reaches a predetermined value greater than the melting temperature of the fusible material 8. The temperature of the milk is then kept constant for a long period depending on the latent heat of solidification of the fusible material and the amount used. Cooling is also obtained without any manual action being taken. The user, e.g. a housewife, therefore has no need to supervise the operation of the yoghurt-making machine after operation of the control of the temperature-limiting element 19.

Of course, the invention is not limited to the embodiments described hereinbefore; more particularly, if needs of various kinds arose, modifications could be made to the shape of the receptacle 3, pots 4 and basin 5, and also to the nature of the materials used, inter alia the fusible material.

Although the invention preferentially relates to a yoghurt-making machine for domestic use, due to its convenient application, it can of course equally well be applied to an industrial yoghurt manufacturing apparatus.

I claim:

1. A yoghurt-making machine, comprising an enclosure having a cover, a receptacle having a bottom wall and a side wall disposed inside said enclosure, a basin fixed in said enclosure below said receptacle, said basin and said receptacle defining therebetween a space which is at least partly filled with a fusible material having a cooling curve exhibiting a solidification plateau at a temperature near to the optimum temperature of yoghurt formation, electrical heating means immersed in said fusible material, said basin having a bottom defining with the enclosure a closed chamber completely separated from said fusible material by said bottom of said basin, a temperature limiting element connected with the heating means and disposed in said chamber in spaced relation to the walls thereof so as to be responsive to only the temperature of the air within said chamber, said temperature limiting element being operative to stop the heating of said fusible material when the temperature in the chamber is significantly higher than that of the solidification plateau of said fusible material, the amount and the latent heat of solidification of said fusible material being sufficient for its solidification plateau to be maintained throughout the duration required for the formation of the yoghurt after heating has stopped.

2. A machine as claimed in claim 1, said fusible material being commercial paraffin wax having a solidification plateau at a temperature of about 52° C.

3. A yoghurt-making machine, according to claim 1, said receptacle having an upwardly extending central projection defining with the side wall of the receptacle a space in which milk pots are disposed and said closed chamber being defined partly by an upwardly central projection of said bottom of said basin which is disposed partly in said central projection of the receptacle and spaced from said central projection of the receptacle.

* * * * *